United States Patent
Heroux et al.

(10) Patent No.: US 10,565,076 B2
(45) Date of Patent: Feb. 18, 2020

(54) DEVICE FOR SUPERVISING AND INITIALIZING PORTS

(71) Applicant: MELEXIS TECHNOLOGIES NV, Tessenderlo (BE)

(72) Inventors: Benoit Heroux, Cormeilles-en-Parisis (FR); Philippe Laugier, Neuilly sur Seine (FR); Thomas Freitag, Plaue (DE)

(73) Assignee: MELEXIS TECHNOLOGIES NV, Tessenderlo (BE)

(*) Notice: Subject to any disclaimer, the term of this patent is extended or adjusted under 35 U.S.C. 154(b) by 128 days.

(21) Appl. No.: 15/974,784

(22) Filed: May 9, 2018

(65) Prior Publication Data

US 2018/0336102 A1    Nov. 22, 2018

(30) Foreign Application Priority Data

May 16, 2017  (EP) ..................................... 17171364

(51) Int. Cl.
*G06F 11/22*  (2006.01)
*G06F 11/30*  (2006.01)
(Continued)

(52) U.S. Cl.
CPC ...... *G06F 11/2221* (2013.01); *G06F 11/3041* (2013.01); *G06F 11/10* (2013.01); *G06F 11/106* (2013.01); *G06F 13/122* (2013.01)

(58) Field of Classification Search
CPC ...... G06F 11/106; G06F 11/22; G06F 11/221; G06F 11/2221; G06F 11/3041; G06F 2211/1088; G06F 13/122
See application file for complete search history.

(56) References Cited

U.S. PATENT DOCUMENTS 5,632,012 A  *  5/1997  Belsan ................ G06F 11/1076
                                              714/6.12
5,784,393 A     7/1998  Byers et al.
                        (Continued)

FOREIGN PATENT DOCUMENTS

EP    0518511 A2   12/1992
WO    9926137 A1    5/1999

OTHER PUBLICATIONS

Extended European Search Report from EP Application No. EP 17171364.7, dated Jan. 12, 2018.

*Primary Examiner* — Gabriel Chu
(74) *Attorney, Agent, or Firm* — Workman Nydegger

(57) ABSTRACT

A device for supervising ports of an integrated circuit is arranged for exchanging information with a central processing unit of an integrated circuit and for communicating with ports of the integrated circuit. The device comprises address decoding means, access control means, and parity controlling means. The device for supervising ports comprises read-back information means arranged for receiving input from the port and for passing that input to the parity control means and in that the address decoding means, the access control means, the read-back information means and the parity controlling means are arranged to be operative in a background loop wherein a range of port addresses is monitored. The read-back information means reads data and one or more parity bits stored on ports with an address in the range and the parity controlling means performs a parity check on the one or more parity bits stored on the ports.

13 Claims, 9 Drawing Sheets

(51) Int. Cl.
*G06F 11/10* (2006.01)
*G06F 13/12* (2006.01)

(56) References Cited

U.S. PATENT DOCUMENTS

| | | |
|---|---|---|
| 7,774,690 B2 | 8/2010 | Ogawa |
| 2002/0036855 A1* | 3/2002 | Lenny .................... G11B 5/012 360/53 |
| 2002/0162076 A1* | 10/2002 | Talagala .............. G06F 11/1076 714/819 |
| 2011/0231730 A1* | 9/2011 | Allen .................... G06F 11/106 714/758 |
| 2012/0254698 A1* | 10/2012 | Ozer .................... G06F 11/106 714/764 |
| 2014/0229766 A1* | 8/2014 | Campbell ............. G06F 11/106 714/15 |
| 2017/0133106 A1 | 5/2017 | Viswanathan Pillai et al. |

\* cited by examiner

DEVICE FOR SUPERVISING AND INITIALIZING PORTS

FIELD OF THE INVENTION

The present invention is generally related to the field of error detection and system security in integrated circuits. More in particular, it is concerned with error detection and system security of an integrated circuit having ports to which peripheral devices can be connected.

BACKGROUND OF THE INVENTION

An integrated circuit (IC) providing for instance a sensing functionality is considered. A data processing unit in the IC receives the sensor output signal and processes the signal further. To carry out the data processing the data processing unit works together with one or more peripheral devices, like an analog-to-digital converter wherein the analog sensor output signal is sampled, digital filters receiving a digital representation of the analog sensor output signal, a timer unit providing a time base for the digital filters and supervising the data processing flow etc . . . . These peripheral devices are usually connected to the data processing unit through ports. The data processing unit can via a data bus read and write data from/to these ports.

In harsh environments, as encountered for instance in the automotive industry, several disturbances, e.g. voltage peaks on the car battery supply line or electrostatic discharge (ESD) and electromagnetic compatibility (EMC) disturbances, may influence the data in these ports. Further, latent defects in the integrated circuit itself might lead to non-consistent data as well. All these effects lead to failing data integrity.

In view of the functional safety requirements imposed by ISO26262, such effects must be covered in safety relevant applications. Failing data integrity must be flagged during operation of the integrated circuit by an error signal to a higher level system or device. With data integrity is in this description meant data consistency to any checking means. The checking means can for example be a redundant register, parity information on the register itself or a comparator that checks whether the data is in a predefined data range. If no data consistency is found, an error signal is generated. When such an error occurs, the higher level system must take adequate measures to keep the overall system in a secure operation. The error signal also may be used to drive the integrated circuit into a secure state.

Hence, there is a need for such a higher level verification unit capable of supervising the proper behaviour of the various system components. In the state of the art several solutions have been proposed.

An easy way to provide supervision is the use of redundant components. E.g. a given port is used two times for the same function in the system. Via data comparison in the ports it can be ensured that failing data in one register flags an error condition, which can be handled by a higher level unit. As an integrated circuit can have several hundreds of ports each having a length of one byte (8 bits), a two times redundancy of these ports leads to a large silicon area and high system cost.

A well-known solution to ensure port data integrity is to exploit parity. This implies the use of one or more additional bits on byte or double byte (word) level to represent the data parity in the port. The use of one or more parity bits guarantees that a single static fault is found at a reasonable cost.

Furthermore peripheral devices are connected to the ports, which are accessed by a central processing unit (CPU) (which acts as a master device) sometimes very often (e.g. when reading a sensor signal via an ADC) and sometimes very rarely (for instance when writing a calibration register for an oscillator).

The CPU (master) performs read and write operations in ports at a rate only known by the application. However, a data integrity loss in a port might immediately affect the system performance, e.g. when the data changes in a port controlling an oscillator, the oscillator frequency changes as well and the system might run in an undefined state.

An illustration of the use of one or more parity bit is given in FIG. 1, where the example is taken of a reset of ports wherein the ports are initialized with predefined data by carrying out a sequence of instructions. A reset is in the prior art mostly described as an asynchronous routine triggered by a reset signal. On the left hand side in FIG. 1 a port is during a classic reset sequence initialized with a certain initialization data (Di) by means of a reset signal. The parity bit(s) is (are) initialized according to this initialization data with Pi. During a next write operation a new data (Dn) with (a) new parity bit(s) (Pn) is written. If everything goes correctly, data and parity match with each other and the verification unit confirms the correct operation of this sequence. FIG. 1 describes on the right hand side an error case. During a reset sequence the port is again initialized with a certain initialization data (Di) and the matching parity bit(s) Pi. Suppose further that the reset signal is now in a so called "stuck at" condition. In such condition the reset signal as a control signal remains tied to active level due a latent fault in the integrated circuit. This may for instance be caused by a leakage current. The reset signal is then always present and continuously forces the port to initialize with the predefined initialization data. During a next write operation the new data (Dn) with the new parity bit(s) (Pn) does not arrive at the port. This is an error. The verification unit does not detect this error condition as the previous initialization data (Di) in the port and its matching parity (Pi) bit(s) are still consistent.

Implementing the parity monitoring and/or the checking function inside each port also increases the silicon size as this mechanism must be typically implemented on the several hundreds of IC ports. Furthermore, the master access in read and write must correlate with the data integrity check, which increases the complexity level and, hence, again the silicon area.

Patent U.S. Pat. No. 5,784,393 is describing an apparatus using a fault detection mechanism on a bus when one or more connected users do not have fault detection capability. This apparatus allows detecting a fault on a communication bus. Also an apparatus is described for performing fault detection on a bus when the bus width is insufficient to accommodate a number of parity bits.

U.S. Pat. No. 7,774,690B2 describes a process completion interrupt and a parity error interrupt. U.S. Pat. No. 7,774,690B2 is concerned with errors in control signals while maintaining the synchronization between the parity computation and the parity checking. The parity is only checked during access of the peripheral function. However, such an approach still leaves room for errors as in the above-mentioned example of an oscillator connected to a port.

Hence, there is a need for a verification unit capable of supervising the safety and in specific the port data integrity.

Moreover, there is need for a way to deal errors with 'stuck at' conditions on control signals as illustrated above.

SUMMARY OF THE INVENTION

It is an object of embodiments of the present invention to provide for a verification device for ensuring error detection and system security of an integrated circuit having ports to connect with peripheral devices.

The above objective is accomplished by the solution according to the present invention.

In a first aspect the invention relates to a device for supervising ports of an integrated circuit. The device is arranged for exchanging information with a central processing unit of an integrated circuit and for communicating with ports of said integrated circuit. The device for supervising ports comprises address decoding means for decoding an address of a port from which a read operation or to which a write operation is to be performed in accordance with information exchanged with the central processing unit, access control means arranged for generating a request towards said port to perform the read operation from or the write operation to the port and for receiving a response to the request from the port and arranged for performing that write operation to the port, parity controlling means arranged for performing a parity check on one or more parity bits contained in the information exchanged with the central processing unit and generating an error signal in case the parity check reveals an error and arranged for, upon a positive response to the request, generating one or more parity bits when performing the write operation to the port, and carrying out a parity check when performing the read operation from the port and generating an error signal in case the parity check reveals an error.

The device further comprises read-back information means arranged for receiving input from said port and for passing said input to the parity control means. The address decoding means, the access control means, the read-back information means and the parity controlling means are arranged to be operative in a background loop wherein a range of port addresses is monitored and wherein the read-back information is arranged for reading data and parity stored on ports with an address in the range and the parity controlling means is arranged for performing a parity check on the one or more parity bits stored on the ports.

The proposed solution indeed allows for supervising ports of an integrated circuit in a way that allows detecting errors easily. The claimed device can exchange information with the central processing unit (CPU). The CPU sends instructions to execute a read or write operation. The port supervising device decodes on receipt of such instruction the port address to be used in the operation. The access controller sends a request to the port in question and the port indicates it accepts or denies the request. If the request is accepted, the parity controlling means operate in the normal way as generally known in the art. That is, it performs a data integrity check on data received from the port. In case this check has a negative outcome (i.e. there is no match with the parity data) an error signal is generated. If the requested operation is a write operation, the parity controller generates one or more parity bits. If it concerns a read operation, a parity check is carried out when reading from the port. An error signal is generated in case the parity check indicates an error has occurred. The error signal is given to a higher level unit inside or outside the integrated circuit, which takes measures for the system security. The error signal might also be used in order to bring the integrated circuit itself to a safe state. What is innovative over the prior art solutions, is that the address decoding means, the read-back information means and the parity controlling means can operate in a background loop wherein a range of port addresses is monitored and wherein the read-back information means can in a read-back operation read information (i.e. data and parity) stored on ports with an address in the range and provide the data and the parity to the parity controller, which is performing a parity check on the data and the parity stored on the ports. Hence, the ports of the integrated circuit are periodically checked in the background loop and not only when the CPU as master device requests access for a read or write operation. It is beneficial that the CPU as master device is not loaded with parity computation and parity checking of the ports. It is also advantageous that seldom accessed ports, as for instance calibration registers as for instance for oscillators, are checked in parity in a regular manner in the background loop. It is also an advantage that checking periodicity is well known and does not depend on the application timing.

In a preferred embodiment the access control means is arranged for interrupting the background loop when an information exchange is requested by the central processing unit. In other words, a master access gets in this embodiment priority over the operation in background loop.

Preferably the access control means is arranged for giving priority to finalising an already started parity check in the background loop when the information exchange is requested by the central processing unit.

The parity controlling means is preferably arranged for performing a data integrity check on said information received from said central processing unit.

In one embodiment the read-back information means is arranged for performing, after completion of the write operation, a read operation, specifically a read-back operation, on data and parity bits written to the port in the write operation, providing the data and the parity bits to the parity control means and the parity control means is arranged for performing the parity check. As the written data is stored and compared during the read operation, it also ensures that the write operation has actual been performed.

In a preferred embodiment the device is arranged for handling read and write operations with byte precision. In another preferred embodiment the device is arranged for handling read and write operations with double byte precision. In another preferred embodiment the device is arranged for handling read and write operations with bit precision.

Advantageously, the access control means is arranged to detect if the port comprises storage means for storing the one or more parity bits and, if so, to include the port's address in the range of port addresses.

In one embodiment the device comprises an initialisation means for initializing one or more ports in a synchronous way with a predefined sequence during an initialization stage.

Advantageously, the parity controlling means is arranged for inverting one or more parity bits comprised in a port initialisation signal before passing the one or more parity bits to said one or more ports.

In another embodiment the port is arranged for receiving the port initialization signal and inverting one or more parity bits.

The invention also relates to an integrated circuit comprising a device for supervising ports as previously described.

In another aspect the invention relates to a method for performing an initialization or a reset of a port of an integrated circuit, the method comprising receiving in a device for supervising ports as previously described, from a central processing unit of the integrated circuit, a port initialisation signal comprising port initialisation data and one or more parity bits, inverting in the device for supervising ports the one or more parity bits in accordance with the port initialization signal, providing the port initialisation signal comprising the port initialisation data and the inverted one or more parity bits to the port of the integrated circuit, on receipt of the port initialisation signal at the port, inverting again in that port the inverted one or more parity bits, thereby obtaining the original parity bits and storing the port initialisation data and the just obtained original one or more parity bits.

The proposed method can obviously be repeated for a number of ports.

In one embodiment the method comprises an additional step wherein the device for supervising ports performs a parity check on said stored just obtained original parity bit(s).

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
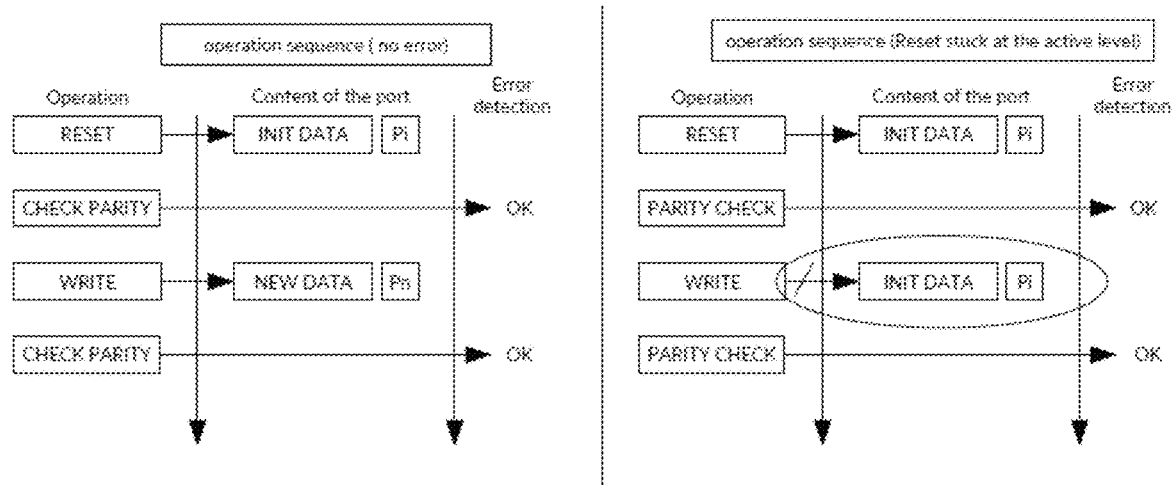
FIG. 1 illustrates the use of parity bit(s) as known in the art and, on the right hand side, a problem that can occur with such prior art approach.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes a port supervising device that handles and monitors the access of for example a central processing unit (CPU) or any other data processing device as e.g. a state machine of an integrated circuit (IC) to ports, on which peripheral devices are connected. This ports supervisor is to be seen as a functional unit (doing the address decoding for instance) and verification unit, which handles the connection between the data bus (of the master device, i.e. the CPU) and the IC ports. This additional device takes only a small area compared to the ports area and adds additional system security in line with the functional safety requirements of ISO26262.

Figure 2:
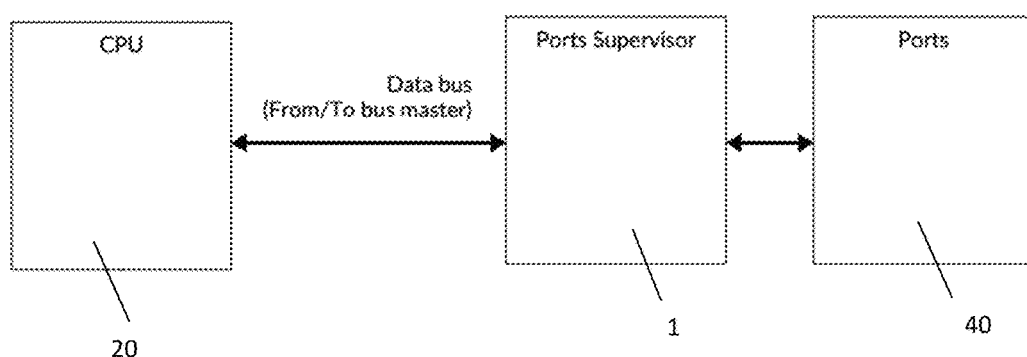
FIG. 2 illustrates the ports supervisor of the invention positioned between the CPU and the IC ports.

A very high level view on the ports supervisor device of this invention is shown in FIG. 2. The device (1) for supervising ports handles the connection via the peripheral data bus between the CPU (20) and the IC ports (40). In a preferred embodiment the device is comprised in the IC.

Figure 3:
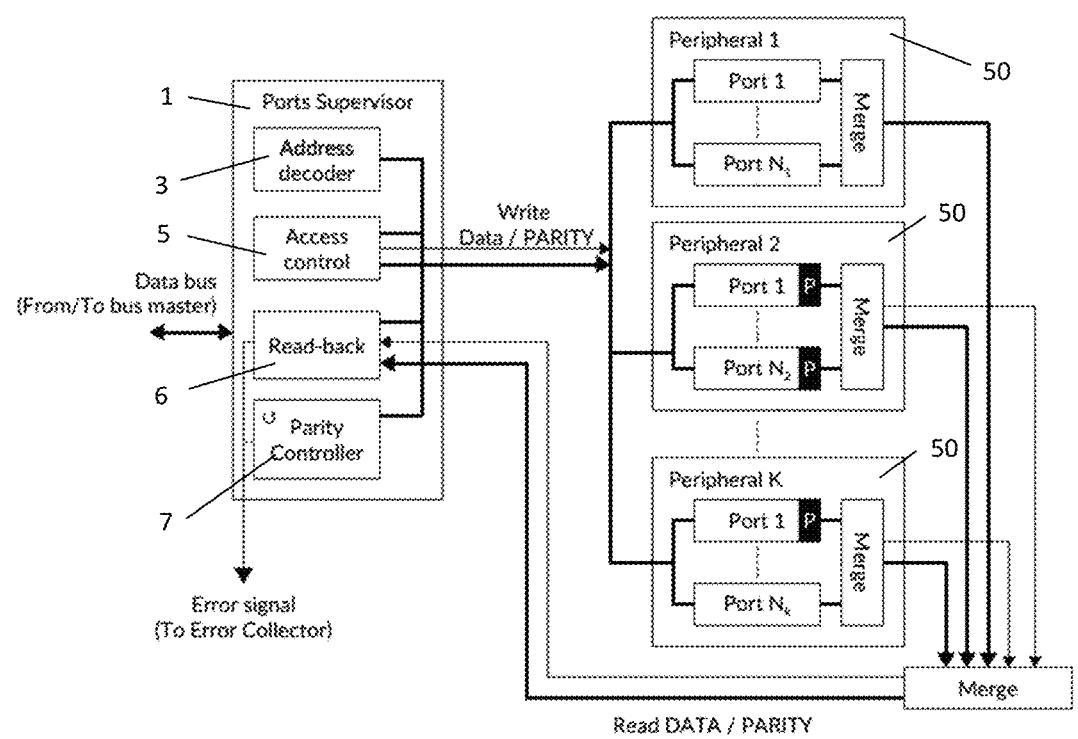
FIG. 3 illustrates a functional block diagram of an embodiment of the port supervising device and the connections to the CPU and peripheral devices.

A functional diagram is shown in FIG. 3. Ports of peripheral devices (50), numbered from 1 to K in the figure, are connected to a data bus through the ports supervisor (1).

The ports supervisor communicates with the CPU and with the ports. It receives from the CPU messages, for example requesting to carry out a read or write operation. Other examples of possible messages are an initialization or a reset request.

The ports supervisor comprises an address decoder (3) to access the connected ports to perform a read or write operation. As the addresses are decoded locally in the ports supervisor, it can in one embodiment be known which ports have the possibility to use a parity check and which ports do not have this possibility. In this scenario the addresses of ports supporting parity checking are already known upfront. In other embodiments the supervising device can detect during operation if a port is arranged for performing parity checking or not. In certain embodiments a mixture of ports with and without parity information is supported as well. Hence, the port supervising device of the invention advantageously supports ports with and without parity function.

An access controller (5) is capable of generating a request towards a port in order to perform a read (or read-back) operation from or a write operation to that port and it is also capable of performing the write operation of data and parity. The access controller subsequently receives a response to the request from the port, indicating whether the request is accepted or denied. The access controller may advantageously further provide control signals to perform a data/parity read from or a write operation to the given port. Control signals can for instance be of an access type (e.g. Read, Write or Read-back), or an initialization request (e.g. Reset) or an access request. One control signal may indicate that an access is requested by the master.

The port supervising device comprises further a read-back information means (6) that receives and reads data and parity from ports, and provides said data and parity to the parity controller (7). This reading is either part of an operation due to a master read access or part of a read-back operation during the background loop as presented below.

The port supervising device also comprises a parity controller (7) for performing a parity check on one or more parity bits contained in the information exchanged with the central processing unit. The parity controller generates an error signal in case the parity check shows there is an error. Suppose the port has given a positive response to a request from the CPU (through the ports supervisor) to perform a read or write operation. When performing the write operation to the port, the parity controller generates one or more parity bits. This is needed for instance, if bytes or bits need to be written as new parity on the port must be generated, as shown for instance in FIG. 6. When performing the read operation from the port, the parity controller carries out a parity check whereby an error signal is generated in case this parity check yields no match and thus indicates an error. Note that this corresponds to the normal operation of a parity control as known in prior art schemes. Both the port parity generation and the parity monitoring are done in the ports supervisor.

The device for supervising ports is wherein it can operate in a background loop. When there is no master access from the CPU, the address decoder, the access controller, the read-back information means and the parity controller can operate in a background loop wherein a range of port addresses is monitored at intervals. This range may comprise all ports of the IC or only a part thereof. During the loop the read-back information means and the parity controller further carry out read-back operations wherein for all ports with an address in that given range the data and parity stored thereon is read and the parity controller performs a parity check. So, in background operation the ports supervisor counts through the address range of the connected ports and reads back data and parity. If a mismatch is detected, an error signal is generated. In case of a match between data and parity, the parity controller does not provide an error signal. It is advantageous that the CPU as master device is not loaded with parity computation and parity checking of the ports nor with a data integrity check, e.g. if the port has actual really been written. It is of further advantage that seldom accessed ports, as for instance calibration registers as e.g. for oscillators, are checked in parity in a regular manner in the background loop.

If a master access through the data bus occurs, this access gets priority and the background loop is stopped. In case of a master access, the data bus data and parity information on the data bus provided by the master is verified in the port supervising device. In case the parity check shows there is no data integrity, an error signal is generated as well. The master read or write access through the ports supervisor is next performed. In case of a read operation, and in case the port supports a parity control, a parity check is provided during that read operation. In case it is a write operation and if the port is supporting parity handling, the parity from the data bus is taken in order to have the port supervising device generating the ports parity. Data and parity are written to the addressed port. In case the port does not support the use of parity bits, only the data is written to the port. Afterwards, immediately after the write operation, the ports supervisor then performs itself a read operation on the just written data without any involvement of the master device. This is hereafter also called a read-back operation. It can be seen as a second type of read-back operation, beside the already mentioned read-back operations for the ports with an address in said given range. If the port supports a parity check, the parity is verified. In case no parity match is obtained, an error signal is generated.

The port supervisor verifies whether the master access is successful in read and write based on the provided parity information of the master device (CPU), on the generated parity information of the ports supervisor and on the physically available or unavailable parity handling of the ports. If for instance in an embodiment a parity is generated for a port, that does not support parity, this is also flagged as an error. If for instance a port requests a parity and the ports supervisor does not generate the requested parity, this is also flagged as a data integrity violation and flagged as an error. All errors are collected and brought into an error signal. In another embodiment the ports supervisor always generates the parity; the ports are free to use it or not. A port without parity returns for instance a "no parity" signal during its read operation. It is advantageous that the design area can so be reduced, since the parity support for each address does not need to be decoded.

If there is no master access through the data bus, the data integrity check is continued in the background loop. If the end of the available address range is reached, the process starts again with the first address and the port corresponding to that address.

Returning now to FIG. 3 some more details are provided. FIG. 3 shows the overall ports organization. Peripherals (50) may contain ports connected to the ports supervisor by control, data and parity signals. The Merge blocks may merge all ports output signals using a simple bitwise OR function. The access control unit (5) grants the port access, if a read-back, a parity check or a master operation (read or write) is requested. In case of a write operation, also data and parity are written by the access control unit to the port addressed by the address decoder (3). The address decoder (3) decodes the port address on the master bus into a single access signal for each single port. The read-back information means (6) receives the data and the parity of the port addressed by the address decoder (3) in case of a read or read-back operation and provides data and parity to the parity controller (7). The parity controller (7) performs data integrity and data parity checks as described. The parity controller generates also the parity bit(s), when this is requested for a write operation.

Figure 4:
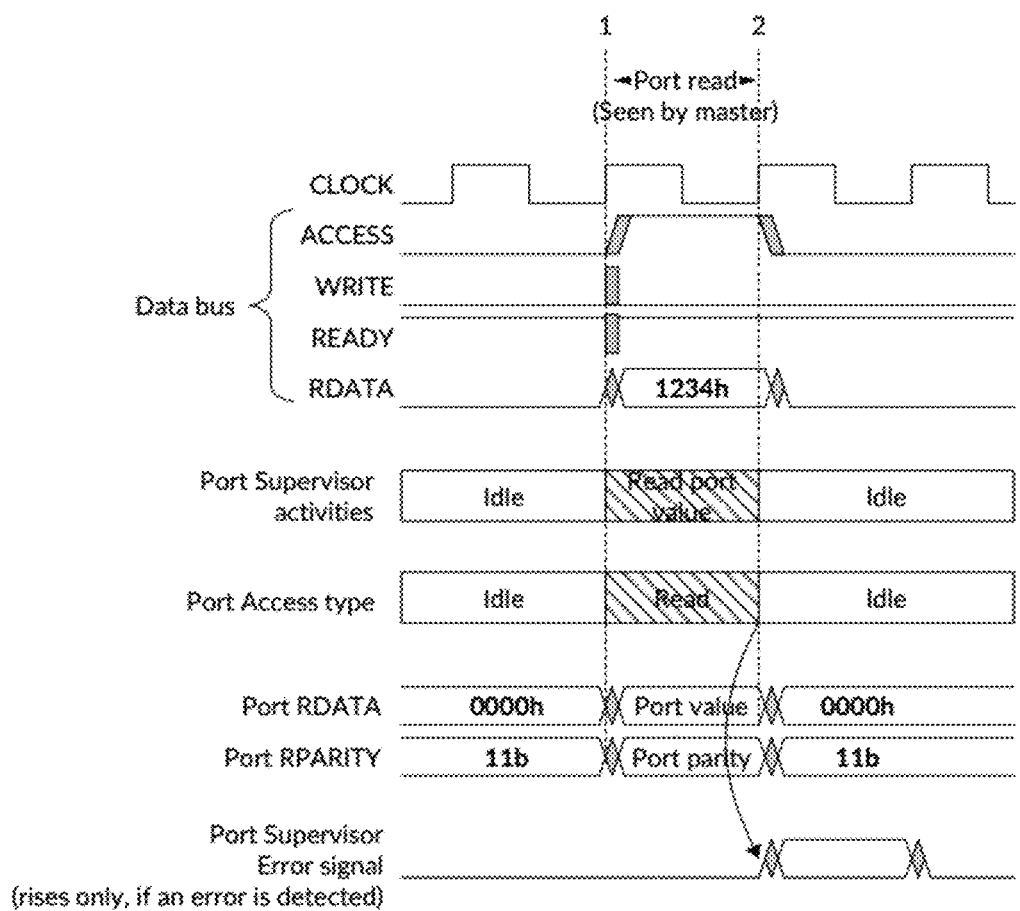
FIG. 4 illustrates a read access on the data bus on word level and the read sequence of a port supervisor according to an embodiment of this invention.

FIG. 4 shows a read access via the data bus and the read sequence of the ports supervisor and the addressed port. The figure shows the access message being received at instant 1. At this moment the port supervisor reads the port content from which is to be read. This sequence is synchronous with the clock. The port supervisor detects a read operation request when access and read signals are in active state (e.g. "high") and transfers the read operation to the requested port. If the read data from the port does not match the read parity, the port supervisor generates an error signal to an active state (e.g. "high").

Figure 5:
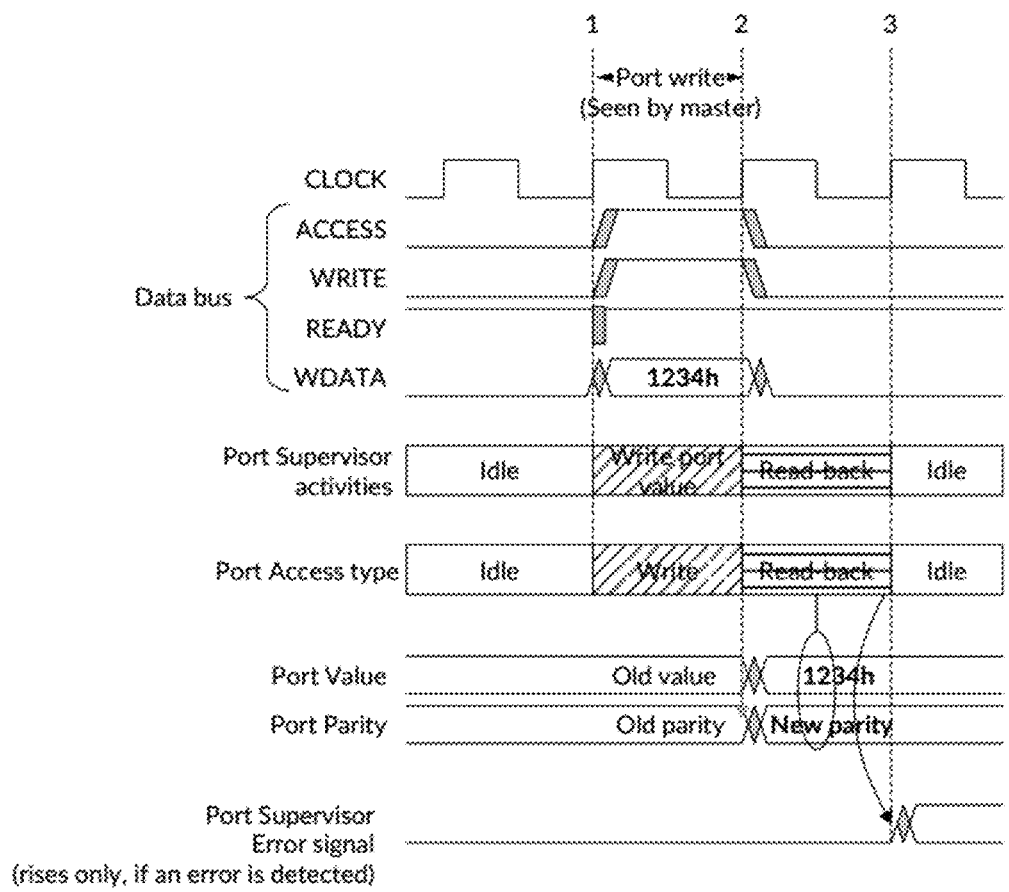
FIG. 5 illustrates a write access on the data bus on word level and the write operation on the addressed port by a port supervisor including parity handling according to an embodiment of this invention.

FIG. 5 shows a similar figure, but now for a write operation. It illustrates a write access of the data bus and the write operation of the ports supervisor and the addressed port. The read-back operation at instant 2, without any involvement of the master device, is also shown. During this read-back operation, the data integrity is checked. This means that the CPU does not lose time while blocking the data bus and waiting for the verification result, which reduces again the CPU load. At instant 1 the master data is written to the requested port and at instant 2 a read-back operation is performed. If at any instant (1 or 2) the port parity does not match the ports data or if the read-back is wrong at instant 2, the port supervisor generates an error signal to an active state (e.g. "high").

In the very rare situation that the master device requests via the data bus a write operation while a read-back operation is still running, the CPU is put in wait mode until the read-back information is finished.

Figure 6:
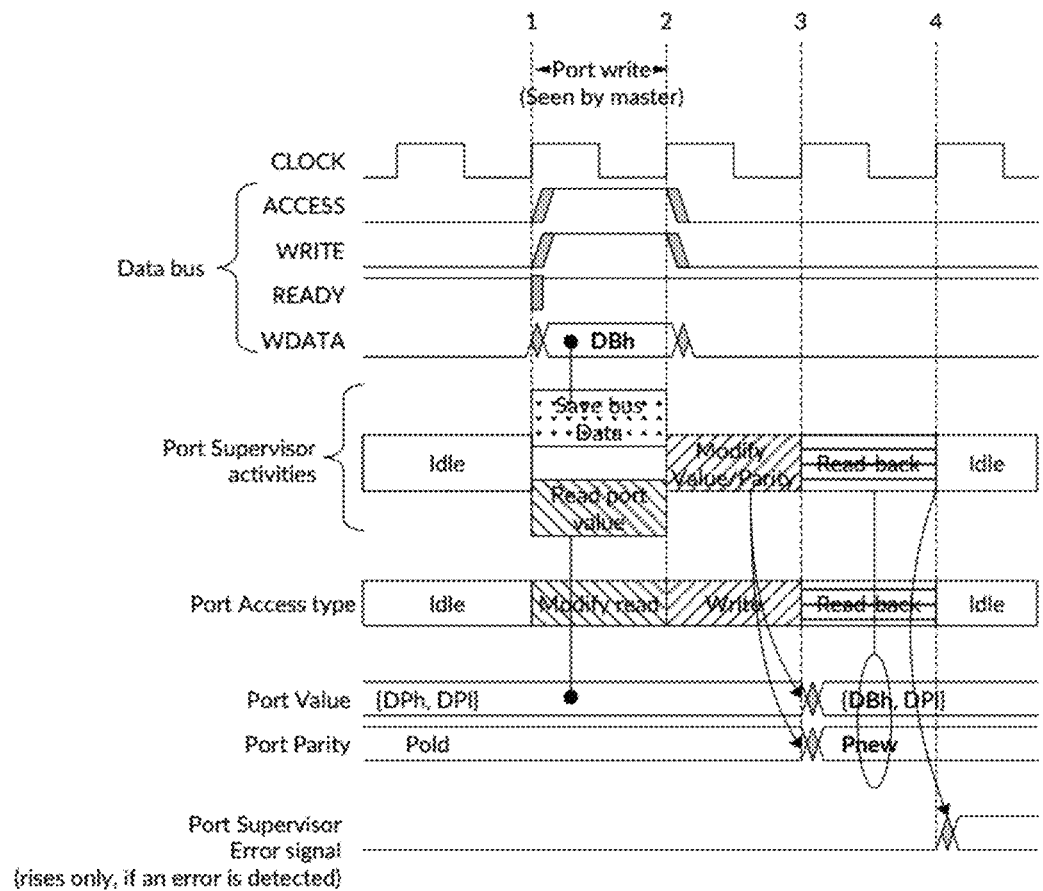
FIG. 6 illustrates a write access on the data bus on byte level and the write operation on the addressed port by a port supervisor including parity handling according to an embodiment of this invention.

FIG. 6 shows in a specific embodiment an implementation of the parity handling if the CPU (master) performs a write operation on byte or bit level, while the ports supervisor might be organized to handle the data on word level (e.g. double byte level). This is supported by a well-known "read-modify-write" process. However, this process must handle the party information as well. This is done directly in the ports supervisor and does not require any involvement of the CPU. The "Write the modified word—Read-back the modified word" phases are also not blocking the bus. So, the CPU does not waste time waiting for the modification to be made nor for the verification to be done, which reduces again the load of the CPU. The "Modify read—Write—Read-back" phases are atomic, so in the very rare case a next access is requested by the CPU during such an operation, the CPU is put in wait mode. The timing for a write access of a byte by the data bus, is the same as for a word as shown in FIG. 5. The same mechanism is valid, if only a bit in a given word should be written, as shown for instance in FIG. 7b.

In another embodiment the ports supervisor also checks data integrity, which is not directly related with a parity function. It can be seen for instance in FIGS. 4, 5 and 6, that the port data is only different from zero, when there is an access request as flagged e.g. in the control signals 'ACCESS' being active (e.g. "high"). If there is a port data activity while there is no access request, this implies that this situation is seen as an error to be reported as an error signal by the ports supervisor. Also this is considered to be part of the data integrity check.

Figure 7A:
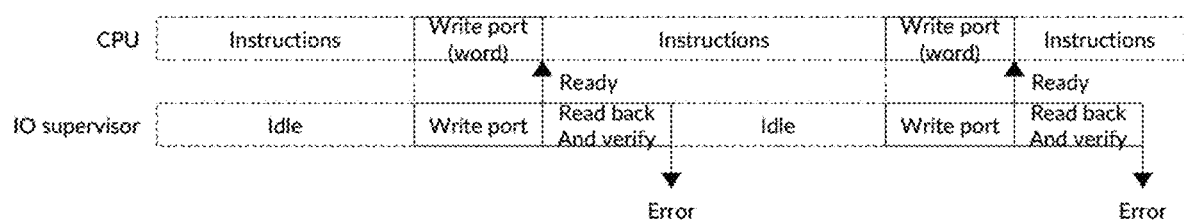
FIG. 7a and FIG. 7b illustrate task sharing between CPU (master) and ports supervisor in case of read operation on word level (FIG. 7a) and in case of a write operation on byte/bit level (FIG. 7b).
Figure 7B:
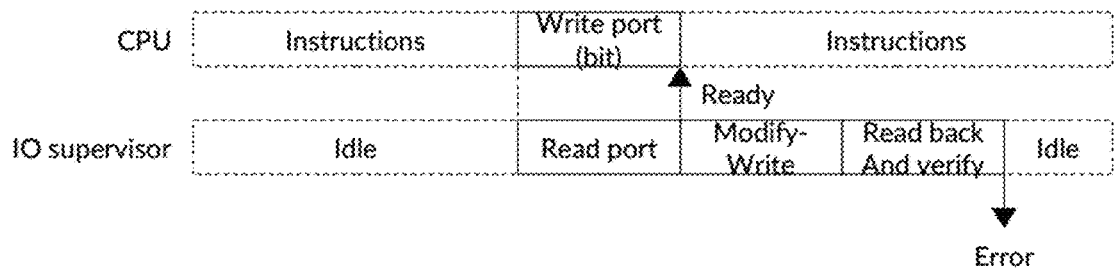

FIG. 7a (for write access on word level) and FIG. 7b (for write access in byte/bit level) show the task handling between the CPU (master) and the ports supervisor, especially the minimal involvement of the CPU for the parity handling/check function. FIG. 7a is another representation of FIG. 5 and FIG. 7b is another representation of FIG. 6. The CPU accesses the ports supervisor for a write operation to a port. The ports supervisor performs the write operation, read-back and verify sequence. At the end of this sequence error information might be given out, if the data integrity is not given. During the "idle" time the ports supervisor is performing the data integrity check and in specific the parity verification on ports, that support a parity test in the background loop as previously described. Further the CPU is only involved in the write access to the ports supervisor and performs outside this access instructions not related to ports.

FIG. 7b is another representation of FIG. 6, with the difference, that here only a single bit should be written to the port. The CPU is only involved in the write to the ports supervisor. In the remaining time it performs instructions not related to ports. The ports supervisor performs the read—modify—write—read-back—sequence in a self-performing manner. During the "idle" time, the ports supervisor is performing the data integrity check and in specific the parity verification on ports, that support a parity test in the background loop as previously described.

Figure 8:
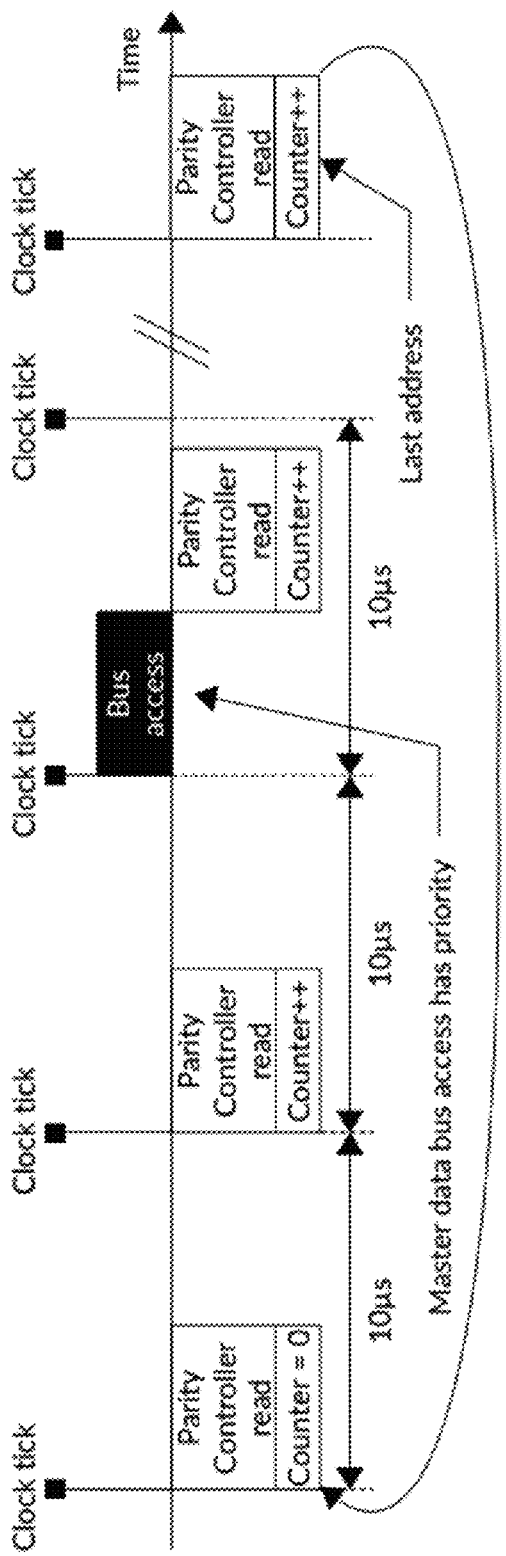
FIG. 8 illustrates the priority of a data bus access over the background loop.

FIG. 8 shows the background loop and the access of the master data bus. The read-back information means and the parity controller iteratively perform a read access on all ports, the parity controller verifies their parity and the ports supervisor checks the data integrity as previously described. If the data integrity on a given port between data and parity is not given, an error signal is generated by the ports supervisor and given to a higher level system. In a practical example a counter is clocked by a 10 μs clock tick. This counter is used in order to loop over all port addresses. Assuming 4 kByte of ports, a complete loop takes 20.48 ms in order to validate all the ports. It should be noticed that this background process does not involve any CPU activity. It also does not require any software. In case of conflict between a master data bus access and a parity control access, the master data bus has always the priority as shown in FIG. 8. In that case the background loop is stopped. The master data bus access is performed and when finished, the background loop is continued.

The ports supervising device of the present invention is further arranged for ensuring a safe port initialization or in particular a reset function by following an instruction sequence as previously described, which ensures also the detection of stuck at faults of control signals as for instance of the port initialisation signal.

Figure 9:
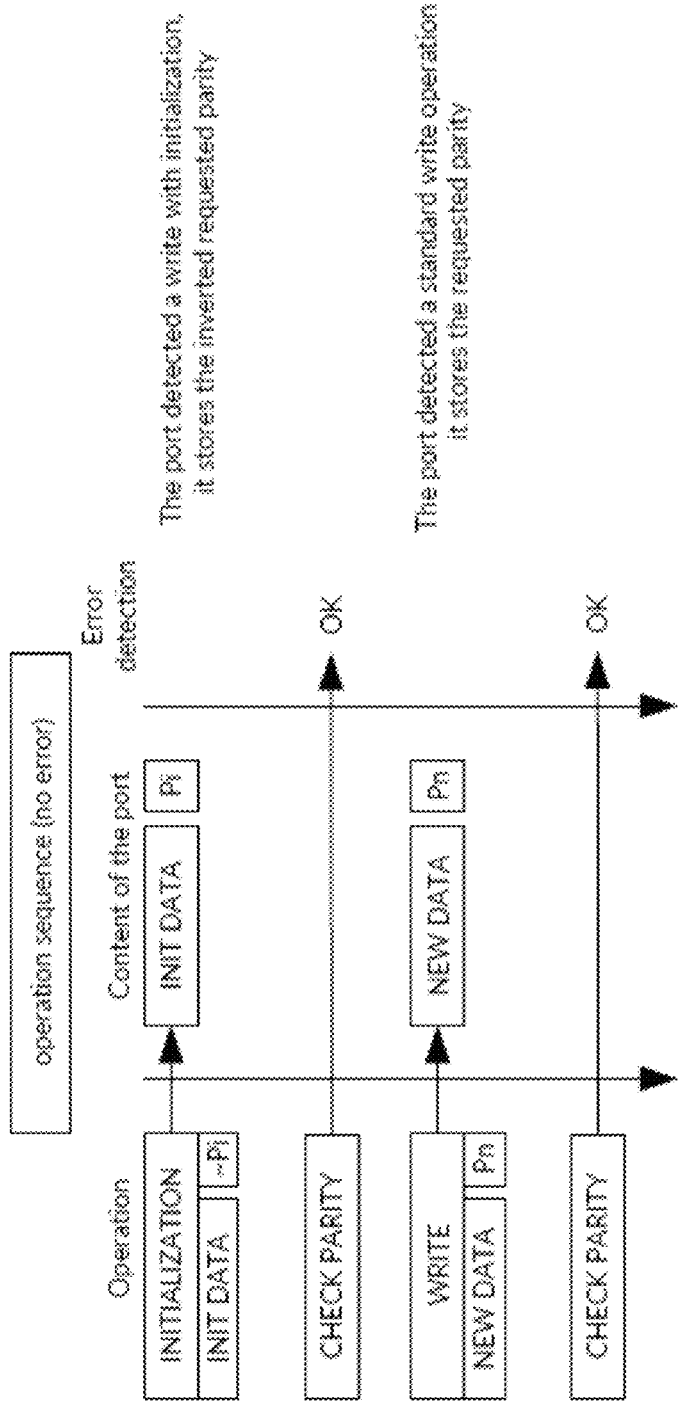
FIG. 9 illustrates the reset and initialisation procedure proposed in this invention.

In order to solve the described problem in FIG. 1, the reset signal is replaced by a synchronous initialization signal. The initialization is now a synchronous routine triggered by a port initialization signal. The following port initialization scheme is proposed according to FIG. 9. The port is initialized with initialization data (Di) by means of an initialization signal, which is representative for the reset signal. The parity bit(s), corresponding to the initialization data, is provided in an inverted manner (~Pi) to the port. The initialization data is given to the port as well. Receiving the initialisation signal triggers the port to invert the parity bit(s) again (Pi). The port stores the initialization data (Di) and the non-inverted parity bit(s) (Pi). The port supervising device sees the initialization data (Di) as well as the matching parity bit(s) (Pi). There is no failure. In a next write operation new data (Dn) and a matching parity bit(s) (Pn) are given to the port. As the initialization signal is not active anymore, the port does not invert the parity bit(s). The new data (Dn) and matching parity bit(s) (Pn) are just stored. The port supervisor sees the new data (Dn) as well as the matching non-inverted parity bit(s) (Pn). There is no failure.

Figure 10:
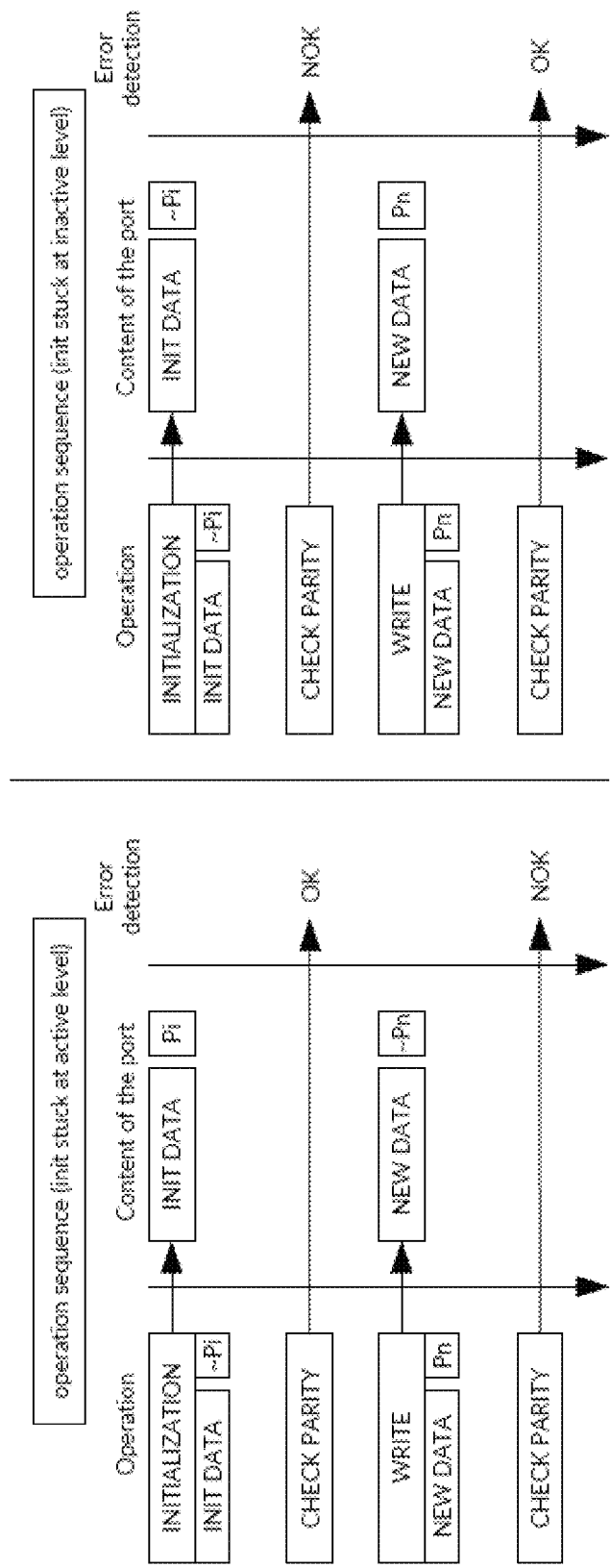
FIG. 10 illustrates failure conditions that can be solved using the proposed approach.

Failure conditions as illustrated in FIG. 10 can now be dealt with. Suppose (left hand part of FIG. 10) the initialization signal (so the signal representative for a reset) is "stuck at active level" inside the port. The port is initialized with initialization data (Di) by means of the initialization signal. The parity bit, corresponding to the initialization data, is provided in an inverted manner (~Pi) to the port. It is repeated once again that there may also be more than one parity bit. The initialization data is given to the port as well. The initialization signal is "stuck at active level" inside the port. Receiving this signal triggers the port to invert the parity bit again. The port is storing the initialization data (Di) and the non-inverted parity bit (Pi). The ports supervisor sees the initialization data (Di) as well as the matching parity bit (Pi). There is no failure. In a next write operation new data (Dn) and a matching parity bit (Pn) is given to the port. As the initialization signal is still "stuck at active level" inside the port, the port inverts the parity bit (~Pn). The new data (Dn) and the inverted parity (~Pn) bit are just stored. The new data (Dn) and the inverted parity bit (~Pn) do not match. The ports supervisor sees the new data (Dn) as well as the non-matching parity bit (~Pn). There is failure indication.

Also in the situation depicted in the right hand part of FIG. 10 the failure condition can be detected. Suppose the initialization signal (so the signal representative for a reset) is "stuck at non active level" inside the port. The port is initialized with an initialization data (Di) contained in the initialization signal. The parity bit(s), corresponding to the initialization data, is provided in an inverted manner to the port (~Pi). The initialization data is given to the port as well. The signal is "stuck at non active level" inside the port. Because of that, that parity is not modified. The port is storing the initialization data (Di) and the inverted parity bit(s) (~Pi). Initialization data (Di) and inverted parity bit(s) (~Pi) do not match anymore. The ports supervisor sees the initialization data (Di) as well as the non-matching parity bit(s) (~Pi). There is a failure indication.

For completeness just the last condition of FIG. 10 (RH side) is given as well. In a next write operation new data (Dn) and a matching parity bit(s) (Pn) are given to the port. As the initialization signal is still "stuck at non active level" inside the port, the port does not invert the parity bit(s). The new data (Dn) and the non-inverted parity bit(s) (Pn) are just stored. The new data (Dn) and the non-inverted parity bit(s) (Pn) match. The ports supervisor sees the new data (Dn) as well as the matching parity bit(s) (Pn). There is no failure.

So it can be demonstrated that with this methodology a "stuck at failure" of the initialization signal during an initialization of ports or, in particular, during a reset inside a port can be detected, which is essential to comply with the functional safety requirements of ISO 26262.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Device for supervising ports of an integrated circuit, said device being arranged for exchanging information with a central processing unit of an integrated circuit and for communicating with ports of said integrated circuit and comprising:

address decoding means for decoding an address of a port from which a read operation or to which a write operation is to be performed in accordance with information exchanged with said central processing unit, access control means arranged for generating a request towards said port to perform said read operation from or said write operation to said port and for receiving a response to said request from said port, said access control means further arranged for performing said write operation to said port, parity controlling means arranged for performing a parity check on one or more parity bits contained in said information exchanged with said central processing unit and generating an error signal in case said parity check yields no match and arranged for, upon a positive response to said request, generating one or more parity bits when performing said write operation to said port, and carrying out a parity check when performing said read operation from said port and generating an error signal in case said parity check yields no match, wherein said device for supervising ports comprises read-back information means arranged for receiving input from said port and for passing said input to said parity control means and in that said address decoding means, said access control means, said read-back information means and said parity controlling means are arranged to be operative in a background loop wherein a range of port addresses is monitored and wherein said read-back information means reads data and one or more parity bits stored on ports with an address in said range and said parity controlling means performs a parity check on said one or more parity bits stored on said ports.

2. Device for supervising ports as in claim 1, wherein said access control means is arranged for interrupting said background loop when an information exchange is requested by said central processing unit.

3. Device for supervising ports as in claim 2, wherein said access control means is arranged for giving priority to finalising an already started parity check in said background loop when said information exchange is requested by said central processing unit.

4. Device for supervising ports as in claim 3, wherein said read-back information means is arranged for performing, after completion of said write operation, a read operation on data and parity bits written to said port in said write operation and said parity control means is arranged for performing said parity check.

5. Device for supervising ports as in claim 3, comprising an initialisation means for initializing one or more ports in a synchronous way with a predefined sequence during an initialization stage.

6. Device for supervising ports as in claim 5, wherein said parity controlling means is arranged for inverting one or more parity bits comprised in a port initialisation signal before passing the one or more parity bits to said port.

7. Device for supervising ports as in claim 5, wherein said port is arranged for receiving the port initialization signal and inverting one or more parity bits.

8. Device for supervising ports as in claim 2, wherein said parity controlling means is arranged for performing a data integrity check on said information received from said central processing unit.

9. Device for supervising ports as in claim 1, arranged for handling read and write operations with byte precision.

10. Device for supervising ports as in claim 1, arranged for handling read and write operations with double byte precision.

11. Device for supervising ports as in claim 10, arranged for handling read and write operations with bit precision.

12. Device for supervising ports as in claim 10, wherein said access control means is arranged to detect if said port comprises storage means for storing said one or more parity bits and, if so, to include said port's address in said range of port addresses.

13. Integrated circuit comprising a device for supervising ports as in claim 1.

* * * * *